US008057898B2

(12) United States Patent
Lee et al.

(10) Patent No.: US 8,057,898 B2
(45) Date of Patent: Nov. 15, 2011

(54) MULTI-FUNCTIONAL HYBRID FIBER BY SIMULTANEOUS MULTI-COMPONENT DEPOSITION, COMPOSITE MATERIAL WITH THE SAME, AND METHOD FOR MANUFACTURING THE SAME

(75) Inventors: Sang Bok Lee, Changwon-si (KR); Joon Hyung Byun, Busan-si (KR); Jin Woo Yi, Changwon-si (KR); Moon Kwang Um, Changwon-si (KR); Sang Kwan Lee, Changwon-si (KR); Won Oh Lee, Changwon-si (KR); O Young Choi, Busan-si (KR)

(73) Assignee: Korea Institute of Machinery & Materials, Taejon (KR)

( * ) Notice: Subject to any disclaimer, the term of this patent is extended or adjusted under 35 U.S.C. 154(b) by 517 days.

(21) Appl. No.: 12/342,123

(22) Filed: Dec. 23, 2008

(65) Prior Publication Data

US 2010/0104868 A1   Apr. 29, 2010

(30) Foreign Application Priority Data

Oct. 28, 2008   (KR) .................. 10-2008-0105620
Oct. 28, 2008   (KR) .................. 10-2008-0105621

(51) Int. Cl.
*D02G 3/00*   (2006.01)

(52) U.S. Cl. ....................... 428/378; 428/379
(58) Field of Classification Search ............. 428/370, 428/378, 379, 381, 368, 367; 205/50
See application file for complete search history.

(56) References Cited

U.S. PATENT DOCUMENTS

| | | | |
|---|---|---|---|
| 6,703,123 B1* | 3/2004 | Shibuta et al. | 428/375 |
| 7,291,391 B2* | 11/2007 | Watson et al. | 428/389 |
| 7,695,644 B2* | 4/2010 | Kosowsky et al. | 252/500 |
| 7,968,010 B2* | 6/2011 | Kosowsky et al. | 252/500 |
| 2010/0104868 A1* | 4/2010 | Lee et al. | 428/368 |
| 2010/0147697 A1* | 6/2010 | Kosowsky et al. | 205/316 |

FOREIGN PATENT DOCUMENTS

JP   01-111830 A   4/1989

* cited by examiner

*Primary Examiner* — N. Edwards
(74) *Attorney, Agent, or Firm* — Saliwanchik, Lloyd & Eisenschenk (57) ABSTRACT

Provided are a multi-functional hybrid fiber, a composite material with the same, and a method of manufacturing the same. The multi-functional hybrid fiber includes a carbon fiber having a bundle of a plurality of continuous fibers, the continuous fiber having an external diameter of 5 μm to 10 μm, a nano particle attached to an outer surface of the carbon fiber by an electrophoretic deposition method, and a metal attached to the outer surface of the carbon fiber by an electroplating method. The nano particle and metal are mixed and attached to the outer surface of the carbon fiber by the simultaneous electrophoretic deposition and electroplating methods.

3 Claims, 7 Drawing Sheets

MULTI-FUNCTIONAL HYBRID FIBER BY SIMULTANEOUS MULTI-COMPONENT DEPOSITION, COMPOSITE MATERIAL WITH THE SAME, AND METHOD FOR MANUFACTURING THE SAME

CROSS-REFERENCE TO RELATED APPLICATIONS

The present application claims the benefit under 35 U.S.C. 119 of Korean Patent Application Nos. 10-2008-0105620, 10-2008-0105621, filed Oct. 28, 2008, which are hereby incorporated by reference in their entirety.

BACKGROUND

The present disclosure relates to a multi-functional hybrid fiber by simultaneous multi-component deposition capable of improving mechanical property, electrical conductivity, and heat conductivity by mixing nano particles and metals and attaching them to a carbon fiber simultaneously through an electrophoretic deposition method and an electroplating method at the same time.

Composite materials, especially carbon fiber or glass fiber reinforced polymer composites, have been extensively applied in the aerospace and the defense industries owing to their lightweight and enhanced strength properties. However, because of low structural/functional characteristics of a polymer material, physical property of composite materials in the thickness direction is weak, which prevents them from being applied to various extensive applications.

A viable alternative to overcome the shortcomings of conventional composites and to provide a multi-functionality is the addition of carbon nanotubes to the materials, i.e. hybrid micro/nanocomposites. Since carbon nanotubes have exceptionally high modulus, strength, electrical conductivity, and heat conductivity, nano composite materials of improved structural and functional characteristics can be expected even if a small amount of nano particles is added to polymer.

However, the hybrid micro/nanocomposite materials containing carbon nanotubes have mechanical property increase of less than 10% level compared to the micro-fiber reinforced composite material due to the limitation of carbon nanotube contents. In order to use a nanocomposite material for a structural and multi-functional purpose, a great amount of carbon nanotubes needs to be added.

However, as the contents of carbon nanotubes in the resin increase the viscosity of the resin mixed with the carbon nanotube is sharply increased, resulting in difficulty in the composite process, especially in the resin transfer method. Another problem in infiltrating a resin mixed with carbon nanotubes into multiple layers of fabrics is that the carbon nanotubes are filtered by fiber bundles of fabrics.

Moreover, in order to be competitive with other composite manufacturing processes, the number of processing steps should to be reduced.

U.S. Patent Publication No. 2008-0118736 discloses a composite material containing a polymer matrix.

However, since the ground graphite material is sprayed on the surface of fillers consisted of fibers or particles, the adhesion of graphite is very poor, resulting in materials loss. The complicated multi-steps in the manufacturing processes also reduce the productivity.

BRIEF SUMMARY

In one embodiment, a multi-functional hybrid fiber by simultaneous multi-component deposition includes: a carbon fiber having a bundle of a plurality of continuous fibers, the continuous fiber having an external diameter of 5 µm to 10 µm; a nano particle attached to an outer surface of the carbon fiber through an electrophoretic deposition method; and a metal attached to the outer surface of the carbon fiber by an electroplating method, wherein the nano particle and metal are mixed and attached to the outer surface of the carbon fiber through the simultaneous electrophoretic deposition and electroplating methods.

In another embodiment, a composite material includes a multi-functional hybrid fiber and a polymer compound impregnated into the hybrid fiber to maintain a form of the hybrid fiber, wherein the multi-functional hybrid fiber includes: a carbon fiber having a bundle of a plurality of continuous fibers, the continuous fiber having an external diameter of 5 µm to 10 µm; a nano particle attached to an outer surface of the carbon fiber through an electrophoretic deposition method; and a metal attached to the outer surface of the carbon fiber through an electroplating method, and the nano particle and metal are mixed and attached to the outer surface of the carbon fiber through the simultaneous electrophoretic deposition and electroplating methods.

In yet another embodiment, a method of manufacturing a multi-functional hybrid fiber through simultaneous multi-component deposition includes: a material preparing operation for preparing a carbon fiber, a nano particle, and a metal material, the carbon fiber having a bundle of a plurality of continuous fibers having an external diameter of 5 µm to 10 µm; a functionalizing operation for allowing a surface of the nano particle to have positive electric charges; and an electro deposition operation for loading the nano particle having the positive electric charges and the metal material into a combined processing bath to simultaneously attach the nano particle and the metal on an outer surface of the carbon fiber.

The details of one or more embodiments are set forth in the accompanying drawings and the description below. Other features will be apparent from the description and drawings, and from the claims.

DETAILED DESCRIPTION

Hereinafter, specific embodiments of the present invention will be described with reference to the accompanying drawings. However, the spirit of the invention is not limited to the embodiments. Other retrograde inventions by adding, changing or deleting other components or other embodiments within the scope of the invention may be easily proposed.

Figure 1:
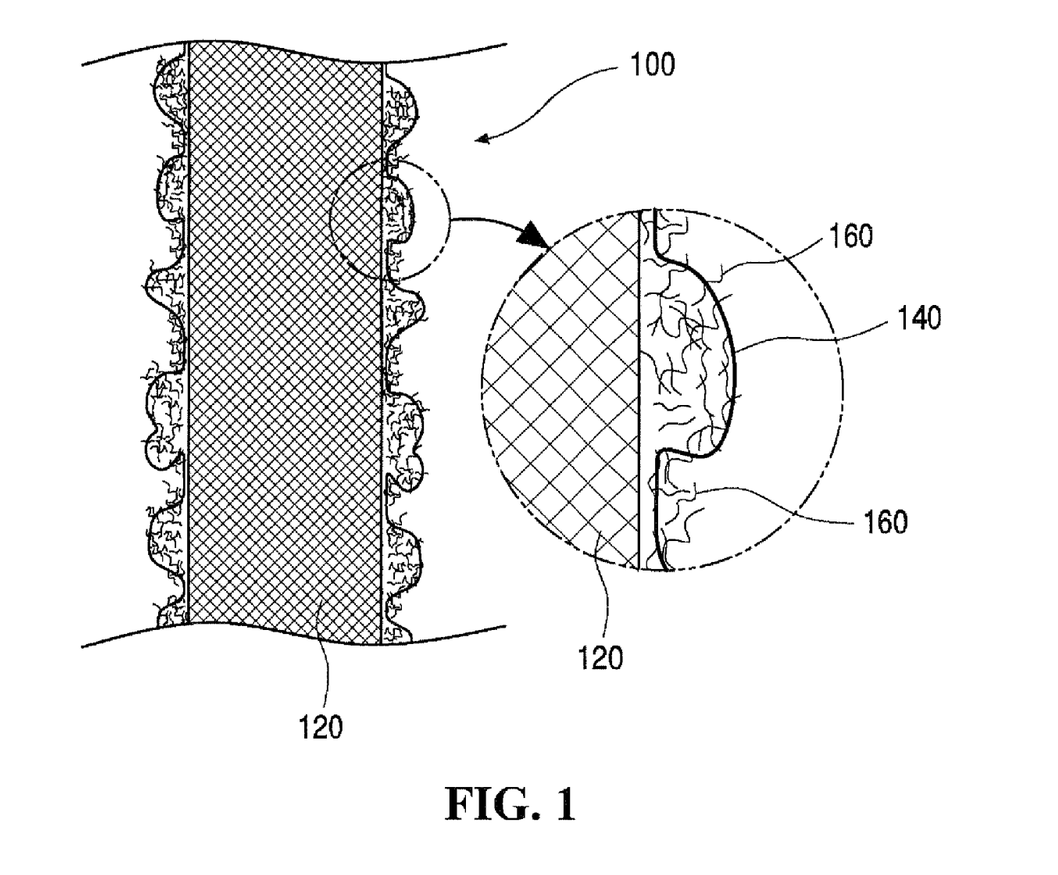
FIG. 1 is a cross-sectional view illustrating an inner structure of a multi-functional hybrid fiber according to an embodiment.

FIG. 1 is a cross-sectional view illustrating an inner structure of a multi-functional hybrid fiber according to an embodiment.

As shown in FIG. 1, the multi-functional hybrid fiber 100 has a basic body formed by a carbon fiber 120 having a bundle of a continuous fiber.

The carbon fiber 120 has a bundle of several thousands of continuous fibers having an external diameter of about 5 μm to about 10 μm. A textile in one direction or a plane direction may be applicable.

A pretreatment process is not performed on the carbon fiber 120 in order for attachment between a nano particle 160 and a metal 140, and a surface cleansing process using alcohol or acetone may be selectively performed.

Additionally, a catalyzing operation S150 using palladium or platinum may be selectively performed on the surface of the carbon fiber 120 to achieve more effective attachment of the metal 140. Moreover, the nano particle 160 and the metal 140 may be attached to the outer surface of the carbon fiber 120.

The metal 140 may have a high conductivity. For example, the metal 140 may be formed of at least one of materials having a high conductivity such as Cu, Au, Ag, Pt, and Ni. In this embodiment, Cu is used for the metal 140. Additionally, it is apparent that the thickness of the metal 140 may diversely range from 1 nm to 500 nm based on a required physical property of the hybrid fiber 100 (e.g., a structural or functional purpose).

The nano particle 160 is disposed on the outer surface of the carbon fiber 120. The nano particle 160 serves to simultaneously improve the strength, rigidity, and conductivity of the carbon fiber 120.

That is, the nano particle 160 and the metal 140 are disposed in a perpendicular direction of the carbon fiber 120 in order to from a layer and are separated from the carbon fiber 120 as shown in FIG. 1. However, the nano particle 160 and the metal 140 are impregnated toward an inner space of the carbon fiber 120 having a textile form in order to improve the strength, rigidity, and conductivity of the hybrid fiber 100. Additionally, the nano particle 160 may include at least one of a carbon nano particle (e.g., a carbon nanotube, a carbon nano fiber, a carbon block, etc.), a ceramic nano particle, and a metal nano particle. In this embodiment, the carbon nanotube is used as the nano particle 160.

Moreover, the metal 140 and the nano particle 160 are simultaneously deposited on the outer surface of the carbon fiber 120 through an electrophoretic deposition method and an electroplating method at the same time.

That is, the nano particle 160 is attached to the outer surface of the carbon fiber 120 through the electrophoretic deposition g method, and the metal 140 is attached to the outer surface of the carbon fiber 120 through the electroplatin method. The electrophoretic deposition method and the electroplating method are performed at the same time. Accordingly, the metal 140 and the nano particle 160 are attached to the outer surface of the carbon fiber 120 as shown in an enlarged portion of FIG. 1.

In more detail, since the nano particle 160 and the metal 140 are simultaneously attached to the outer surface of the carbon fiber 120 through the electrophoretic deposition method and the electroplating method at the same time, as shown in the enlarged portion of FIG. 1, the nano particle 160 may be attached to the outer surface of the carbon fiber 140 first and then the metal 140 may surround the nano particle 160. On the contrary, the metal 140 may be deposited on the outer surface of the carbon fiber 120 first and then the nano particle 160 may be inserted into the inside of the metal 140.

Accordingly, compared to a hierarchy structure where the nano particle 160 and the metal at the outer surface of the carbon fiber 120 are formed of respectively separated layers, the hybrid fiber 100 including a mixed structure of the nano particle 160 and the metal 140 has more excellent interfacial coherence and due to this, mechanical property and electrical and thermal properties can be improved.

Hereinafter, a method of manufacturing the multi-functional hybrid fiber will be described with reference to FIG. 2.

Figure 2:
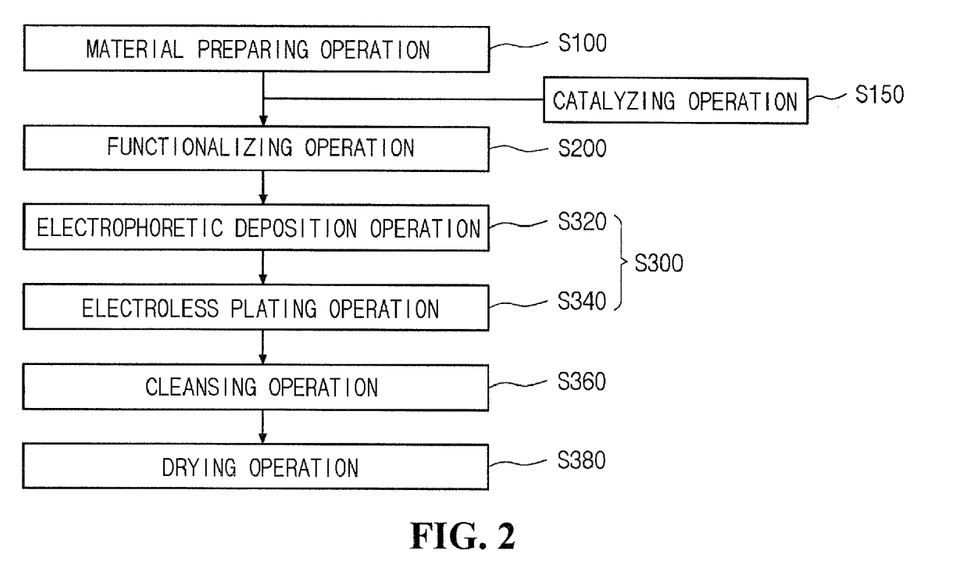
FIG. 2 shows operations for a method of manufacturing a multi-functional hybrid fiber through simultaneous multi-component deposition.

FIG. 2 shows operations for a method of manufacturing a multi-functional hybrid fiber through simultaneous multi-component deposition.

Figure 3:
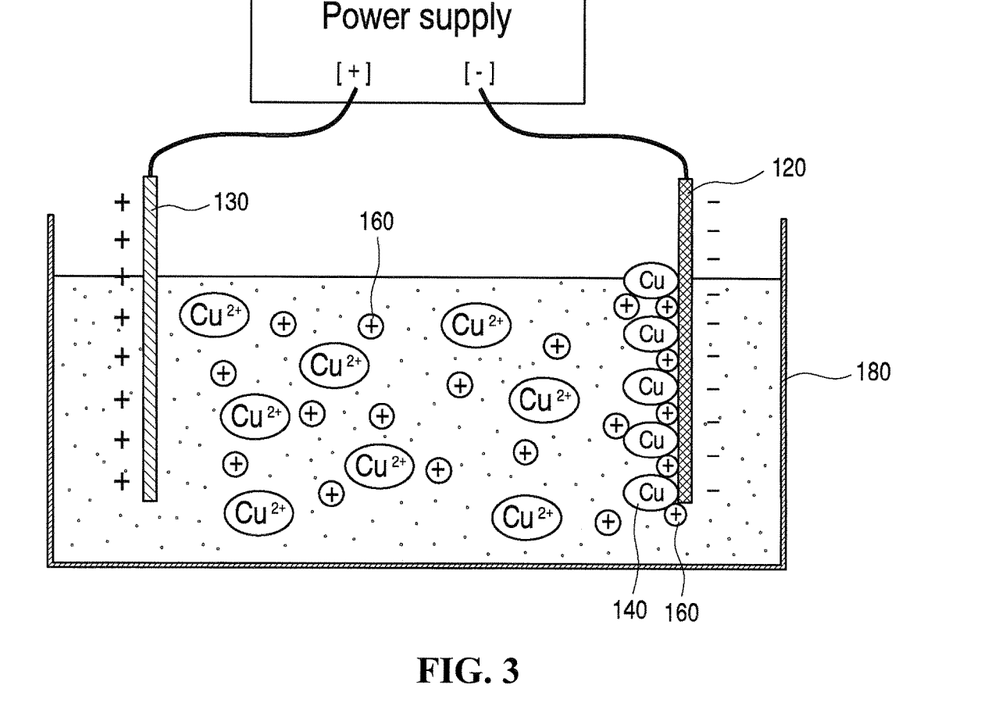
FIG. 3 is a conceptual diagram illustrating a principle of an electro deposition operation, which is the first operation in a method of manufacturing a multi-functional hybrid fiber through simultaneous multi-component deposition according to an embodiment.

As illustrated in the drawings, the method of manufacturing the hybrid fiber 100 includes a material preparing operation S100, a functionalizing operation S200, and an electro deposition operation S300. In the material preparing operation S100, a carbon fiber 120, a nano particle 160, and a metal material 130 of FIG. 3 are prepared. The carbon fiber 120 includes a bundle of continuous fibers having an external diameter of about 5 μm to about 10 μm. The functionalizing operation S200 allows the surface of the nano particle 160 to be charged with positive electric charges. The electro deposition operation S300 loads the nano particle 160 charged with positive electric charge and the metal material 130 into a combined treatment bath 180 containing an electrolyte so that the nano particle 160 and the metal 140 are simultaneously attached to the outer surface of the carbon fiber 120.

In the material preparing operation S100, various solvents such as water, ethanol, methanol, acetone, propanol, dimethylformamide (DMF), and dimethylacetamide (DMA), which have a relative permittivity of at least 5, can be selectively used as the electrolyte.

Additionally, the material preparing operation S100 may selectively include a surface cleansing operation (not shown) for cleansing the surface of the carbon fiber 120 through alcohol or acetone in order to easily attach the nano particle 160 and the metal 140 to the surface of the carbon fiber 120 and a catalyzing operation S150 for achieving catalysis through palladium or platinum.

Once the material preparing operation S100 is completed, the functionalizing operation S200 is performed. The functionalizing operation S200 allows the surface of the nano particle 160 to be charged with positive electric charges. This is possible by introducing a function group such as an imine group and an amine group.

That is, the functionalizing operation S200 adds polyethylenimine (PEI) of 0.5 g and a carbon nanotube of 2 g to water of 100 mg and processes them with ultrasonic waves for 15 minutes.

At this point, the nano particle 160 is charged with positive electric charges by introducing the imine group. That is, the nano particle 160 is sufficiently cleansed and filtered in the electrolyte and then is dried for about ten hours in a vacuum oven of about 70° C., such that the surface of the nano particle 160 is charged with positive electric charges by introducing the imine group.

Additionally, the nano particle 160 (a carbon nanotube is used in this embodiment) passing through the functionalizing operation S200 is selectively and sufficiently cleansed and filtered, and then is dried for about ten hours in a vacuum oven of about 70° C. Again, they are put in the electrolyte and are distributed and processed with ultrasonic waves of a bath type and a beam type.

Additionally, the functionalizing operation S200 may allow the surface of the nano particle 160 to be charged with positive electric charges through a plasma process by introducing a function group such as the imine group and the amine group.

After the functionalizing operation S200, the electro deposition operation S300 is performed. The electro deposition operation S300 is a process for attaching the functionalized nano particle 160 and metal 140 to the outer surface of the carbon fiber 120. The metal 140 includes at least one of materials having a high conductivity such as Cu, At, Ag, Pt, and Ni.

At this point, according to a required property of the hybrid fiber 100 such as a structural role or a functional role, the metal 140 may be diversely deposited within a thickness range from about 1 nm to about 500 nm.

In more detail, the electro deposition operation S300 includes an electrophoretic deposition operation S320 for attaching the nano particle 160 to the outer surface of the carbon fiber 120 through an electrophoretic deposition method, and an electroplating operation S340 for attaching the metal material 130 to the outer surface of the carbon fiber 120 through an electroplating method. The electrophoretic deposition operation S320 and the electroplating operation S340 are performed at the same time.

Hereinafter, the electro deposition operation S300 will be described in more detail with reference to FIG. 3.

FIG. 3 is a conceptual diagram illustrating a principle of an electro deposition operation, which is the first operation in a method of manufacturing a multi-functional hybrid fiber through simultaneous multi-component deposition according to an embodiment.

As shown in FIG. 3, according to an embodiment, when the nano particle 160 charged with distributed positive electric charges and the electrolyte are loaded in the complex processing bath 180, the carbon fiber 120 is connected to a cathode and the metal material 130 is connected to the anode. Then, the carbon fiber 120 and the metal material 130 are spaced a predetermined distance apart from each other and then are fixed at a position where they stay.

A Cu plate is used as the metal material 130 and a carbon nanotube is used as the nano particle 160. A spaced distance between the carbon fiber 120 and the Cu plate is 0.8 cm.

Next, a voltage of about 30 V is applied to the carbon fiber 120 and the nano particle 160 for 5 minutes.

At this point, the carbon nanotube charged with positive electric charges is deposited on the surface of the carbon fiber 120 having negative electric charges through an electrophoretic deposition method in order to form the nano particle 160. The anode is connected to the metal material 130 and is ionized (i.e., $Cu \rightarrow Cu^{2+}+2e^-$) through the electrolyte, and then the ionized $Cu^{2+}$ is attached to the outer surface of the carbon fiber 120 and the nano particle 160 connected to the cathode to form the metal 140.

Accordingly, once the electro deposition operation S300 is completed, the nano particle 160 and the metal 140 are simultaneously formed on the outer surface of the carbon fiber 120.

In more detail, the nano particle 160 may be attached to the outer surface of the carbon fiber 120 first, and the metal 140 may surround the outer surface of the nano particle 160. On the contrary, the metal 140 may be attached to the outer surface of the carbon fiber 120 first, and the nano particle 160 may be inserted into the metal 140 while the metal 140 is deposited.

After the electro deposition operation S300, the cleaning operation S360 is performed. During the cleansing operation S360, the carbon fiber 120 to which the nano particle 160 and the metal 140 are attached is pull out from the combined processing bath 180 in order to cleanse it with the electrolyte.

The cleansing-completed hybrid fiber 100 is loaded into a vacuum oven and is dried for about ten hours at a temperature of about 70° C. In such a way, a dry operation S380 is performed.

Figure 5:
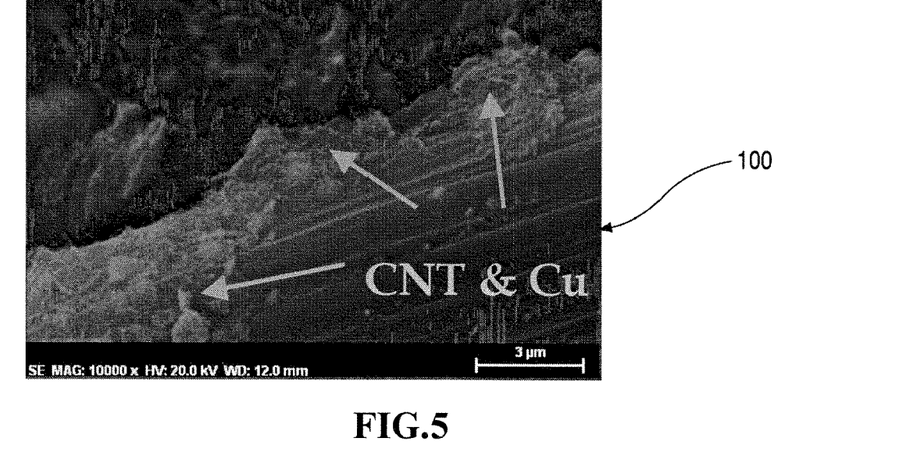
FIG. 5 is an enlarged picture of FIG. 4.

Once the dry operation S380 is completed, the nano particle 160 surrounded by the metal 140 is attached to the outer surface of the hybrid fiber 100 to have a protrusion. In FIG. 5, it is confirmed that the carbon nanotube and the metal 140 are simultaneously deposited.

Figure 4:
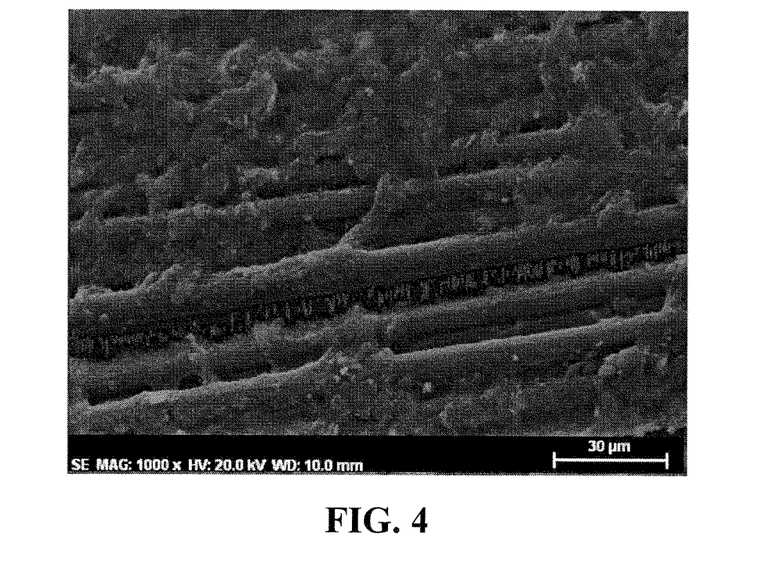
FIG. 4 is an actual object enlargement picture of a hybrid fiber according to a method of manufacturing a multi-functional hybrid fiber through simultaneous multi-component deposition.

FIGS. 4 and 5 are actual object enlargement pictures of a hybrid fiber according to a method of manufacturing a multi-functional hybrid fiber through simultaneous multi-component deposition.

Figure 6:
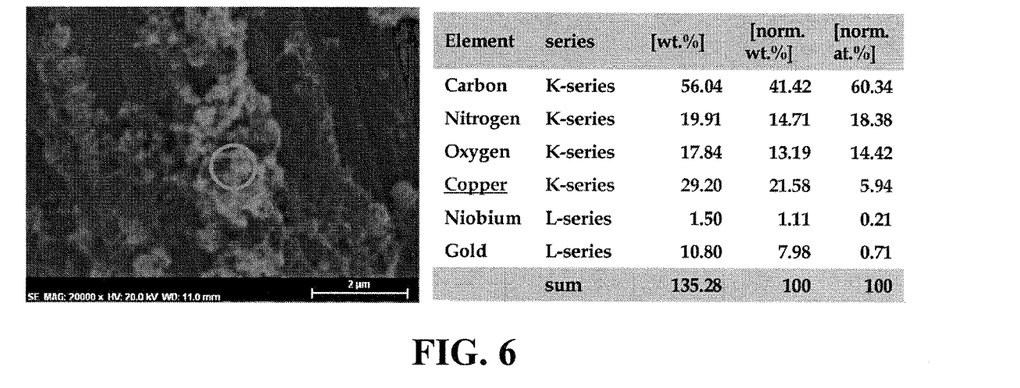
FIG. 6 illustrates an ESD component analysis result of a multi-functional hybrid fiber according to a method of manufacturing a multi-functional hybrid fiber through simultaneous multi-component deposition.

Additionally, as a result of an ESD component analysis on a component of a hybrid fiber according to an embodiment, as shown in FIG. 6, it is confirmed that Cu used as the metal material 130 is detected.

According to an embodiment, a composite material having a multi-functional hybrid fiber is manufactured in order to measure electrical conductivity and strength of the above multi-functional hybrid fiber.

At this point, the composite material includes a multi-functional hybrid fiber and a polymer compound impregnated into the multi-functional hybrid fiber. The polymer compound includes at least one of a thermoset resin and a thermoplastic resin.

Moreover, the polymer compound selectively includes at least one of a nano material and a nano carbon material.

Furthermore, the nano material has a grain size of less than about 500 nm, and includes at least one of conductive metals such as Cu, Au, Ag, Pt, and Ni.

Moreover, the nano carbon material has a grain size of less than about 500 nm and includes at least one of nano particles such as a carbon nanotube, carbon nano fiber, and a carbon black.

According to an embodiment, the composite material is formed by stacking 12 layers of fabrics of multi-functional hybrid fiber sized of 80 mm×80 mm and then impregnating an epoxy resin (YD128+KBH1089) in the fabrics.

The hybrid fiber where the epoxy resin is impregnated is heated in an oven for about two hours at a temperature of about 120° C. in order to harden it, such that the composite material is manufactured.

The shear strength of the manufactured composite material is measured through a short beam test, and electrical conductivities of a plane direction and a thickness direction are measured through a 2-probe conductivity test. Their test results are shown in FIGS. 7 to 9.

Figure 7:
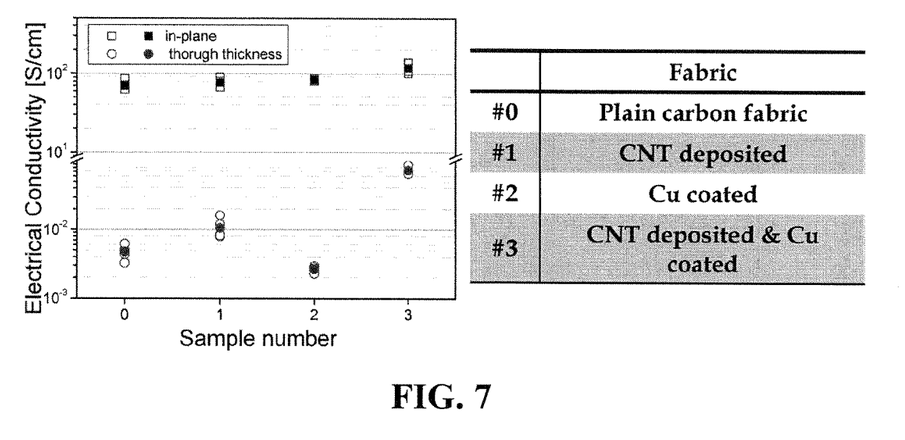
FIG. 7 illustrates a composite material having a multi-functional hybrid fiber through simultaneous multi-component deposition and measured experimental data of electrical conductivity of a comparative example.

As illustrated in FIG. 7, as a result of measuring electrical conductivity of a comparative example and a practical example, electrical conductivity of the practical example in a plane direction and a thickness direction of the composite material is higher than that of the comparative example.

Especially, electrical conductivity in a thickness direction of a composite material is an average of about $7.4 \times 10^{-2}$ S/cm, which is more than about $5.0 \times 10^{-2}$ S/cm. Compared to the comparative example, obvious improvement of electrical conductivity is confirmed when the carbon nanotube and the metal are simultaneously deposited on the carbon fiber. In FIG. 7, a comparative example #0 is a case where the composite consists of only the carbon fiber. A comparative example #1 is a case where only a carbon nanotube is deposited on the carbon fibers. A comparative example #2 is a case where only a metal is coated. A comparative example #3 is a case where both of the carbon nanotube and the metal are coated.

Figure 8:
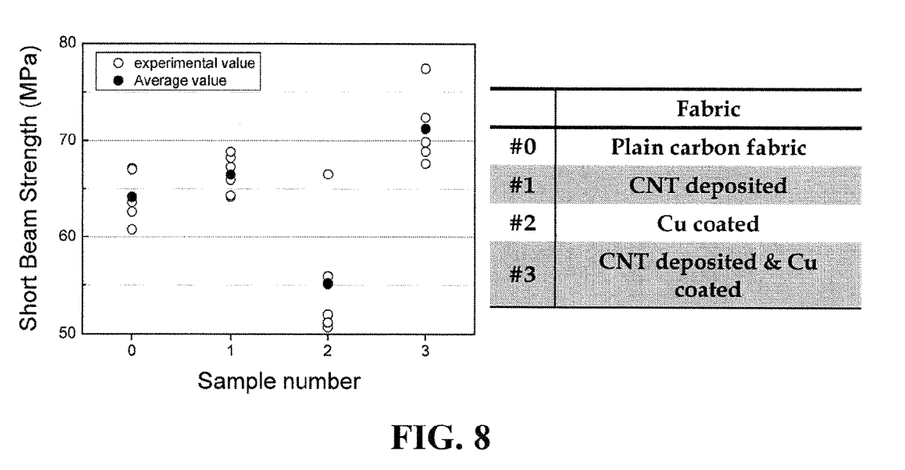
FIG. 8 illustrates a composite material having a multi-functional hybrid fiber through simultaneous multi-component deposition and measured experimental data of shear strength of a comparative example.
Figure 9:
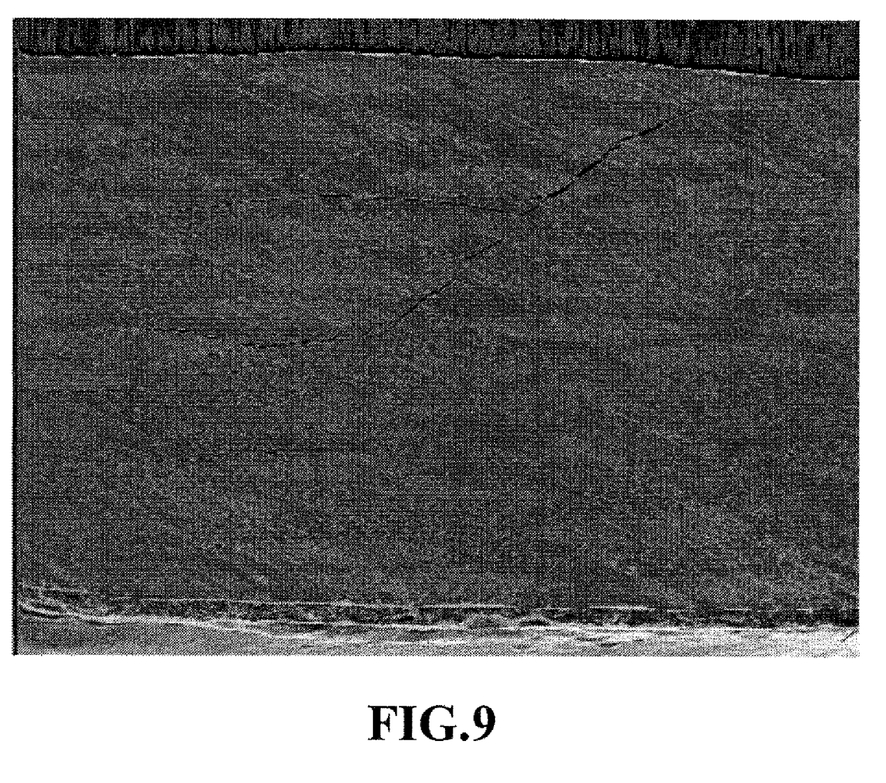
FIG. 9 illustrates a crack image of a practical example and a comparative example after measuring interfacial shear strength of FIG. 8.

As a result of measuring electrical conductivity of the comparative and practical examples used in FIG. 7, as illustrated in FIG. 8, a composite material of a practical example has shear strength of about 72 Mpa, which is relatively higher than that of a comparative example.

Additionally, as shown in the picture of FIG. 9, when considering crack of the thickness direction (the up and down direction), an interlayer delamination does not occur, such that it is apparent that the thickness direction and plane direction are structurally stable.

On the other hand, other embodiments may be applied to a method of manufacturing a multi-functional hybrid fiber through simultaneous multi-component deposition during forming of a metal material.

Figure 10:
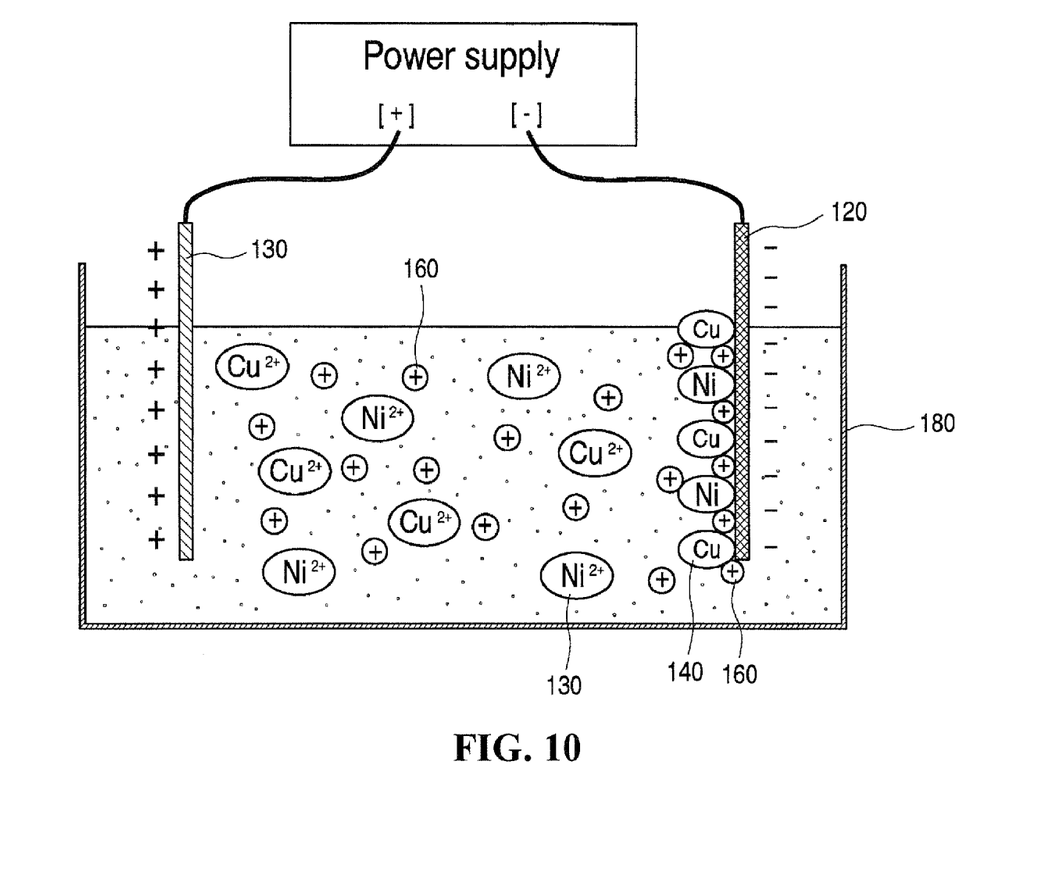
FIG. 10 is a conceptual diagram illustrating a method of manufacturing a multi-functional hybrid fiber through simultaneous multi-component deposition according to another embodiment.

That is, FIG. 10 is a conceptual diagram illustrating a method of manufacturing a multi-functional hybrid fiber through simultaneous multi-component deposition according to another embodiment. The metal material of the another embodiment includes various kinds of composite metals instead of single material.

That is, the metal material 130 may include an alloy or a composite metal including more than two kinds of metals. Additionally, the metal material 130 and a plate metal material 130, ionized by dissolving and applying a plating solution in the electrolyte, may be configured to include respectively different materials.

At this point, the nano particle 160 and a compound or a composite metal including more than two kinds of metals may be simultaneously deposited on the outer surface of the carbon fiber.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multi-functional hybrid fiber by simultaneous multi-component deposition, the multi-functional hybrid fiber comprising:
   a carbon fiber having a bundle of a plurality of continuous fibers, the continuous fiber having an external diameter of 5 μm to 10 μm;
   a nano particle attached to an outer surface of the carbon fiber by an electrophoretic deposition method; and
   a metal attached to the outer surface of the carbon fiber by an electroplating method,
   wherein the nano particle and metal are mixed and attached to the outer surface of the carbon fiber by the simultaneous electrophoretic deposition and electroplating methods.

2. The multi-functional hybrid fiber according to claim 1, wherein the metal comprises at least one of conductive metals including Cu, Au, Ag, Pt, and Ni.

3. The multi-functional hybrid fiber according to claim 1, wherein the metal has a thickness of 1 nm to 500 nm.

* * * * *